United States Patent [19]

Harrison

[11] 3,989,032

[45] Nov. 2, 1976

[54] SOLAR WATER HEATING SYSTEM

[75] Inventor: Henry Harrison, Locust Valley, N.Y.

[73] Assignee: Halm Instrument Co., Inc., Glen Head, N.Y.

[22] Filed: Dec. 8, 1975

[21] Appl. No.: 638,350

[52] U.S. Cl. ............................ 126/271; 137/59; 237/1 A; 237/66; 237/80
[51] Int. Cl.² ........................................... F24J 3/02
[58] Field of Search ............ 126/270, 271; 237/1 A, 237/66, 80; 137/59

[56] References Cited
UNITED STATES PATENTS

| | | | |
|---|---|---|---|
| 1,753,227 | 4/1930 | Wheeler et al. | 126/271 |
| 2,238,952 | 4/1941 | Stacey, Jr. | 237/80 |
| 2,342,211 | 2/1944 | Newton | 126/271 |
| 3,434,660 | 3/1969 | Brumme et al. | 237/66 |
| 3,799,145 | 3/1974 | Butterfield | 126/271 |
| 3,934,556 | 1/1976 | Baumgartner | 237/66 |

Primary Examiner—Kenneth W. Sprague
Attorney, Agent, or Firm—James P. Malone

[57] ABSTRACT

A system for solar heating of water in combination with a domestic hot water system having a hot water storage tank having an inlet and an outlet, and a controllable heater arranged for heating water for storage within said storage tank.

A solar heat collector has a surface which absorbs sunlight to produce heat, and a heat exchange passage for water in heat conductive relation. Piping and pump means are provided for circulating water from said tank outlet through said collector heat exchange passage to said tank inlet.

An inflatable elastic member extends substantially the entire length of said collector passage.

Means are provided to maintain air within said inflatable member at a higher hydrostatic air pressure than the static hydrostatic water pressure in said passage whereby the collector is rendered tolerant to freezing.

9 Claims, 7 Drawing Figures

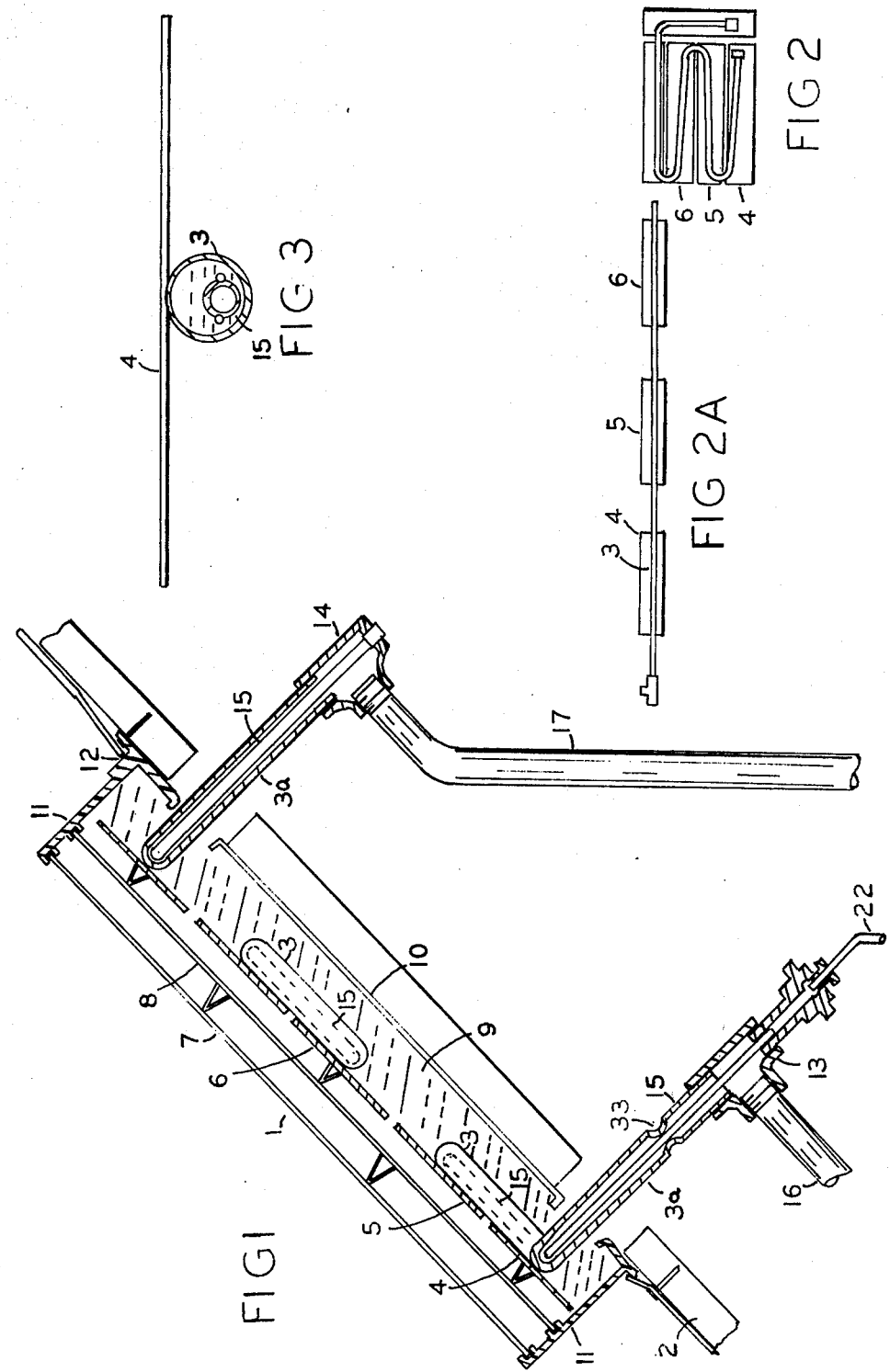

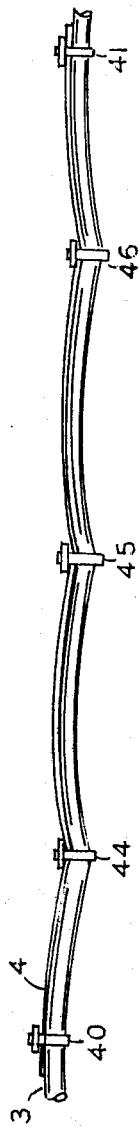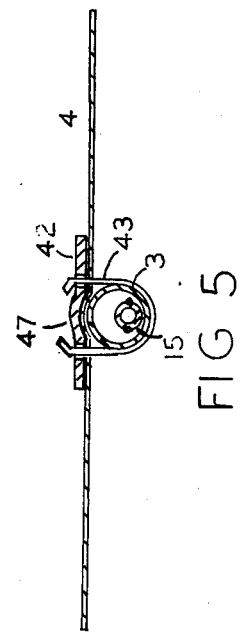

SOLAR WATER HEATING SYSTEM

This invention relates to solar hot water heating system.

There is a need for a simple solar heat collection system for heating domestic hot water which can be used as a fuel-saving adjunct to existing hot water heating systems. Although solar heat collection systems for this purpose are known, they have significant limitations which have slowed their acceptance by the public.

Gravity-circulating thermosyphon systems require that the hot water storage tank be located above the solar heat collector, which is ofen an architectural disadvantage, especially in houses which are already constructed. Therefore, pumped systems which are adaptable to any tank or collector location are preferable for retrofit applications.

In any region where freezing weather occurs, the liquid in the collector can freeze, and when it freezes it expands and can damage exposed pipes. Various ways of overcoming this problem are known. For example, the collector may be drained when low temperatures are expected or when sun heat is not being collected. This requires a reliable valve system and a heat exchanger to isolate the collector from the pressurized domestic water supply. Alternatively, the collector may employ a heat exchange fluid like ethylene glycol which does not freeze at winter temperatures, but then double-barrier heat exchangers must be used to keep these poisonous liquids out of the potable hot water systems. Additional heat exchangers are known to reduce the efficiency of a solar heat collection system substantially.

Another known way to prevent freezing is to circulate warm water through the collector during times of freezing temperatures. This requires a more complex control system which can reliably respond to outdoor temperature and preferably a flow-control circulating system to keep wasted heat no greater than required.

Still another solution to the freezing problem is to make the collector and associated exterior piping freeze-tolerant, so that repeated freezing will not cause any permanent damage to the system. This is the preferred approach adopted in this invention.

It is a primary object of this invention to provide a solar heating system for heating domestic hot water. It is a further object to provide such a system which can be used in conjunction with commonly used domestic hot water systems with only minor modifications.

Another object is to provide a solar heating system for domestic hot water which can operate without attention and substantially without maintenance in freezing weather and in the hot summer months.

Another object is to provide a solar water heating system which can operate efficiently and safely without danger of contaminating the domestic hot water.

Another object is to provide a new and improved system for solar heating of water in combination with a domestic hot water system having a hot water storage tank having an inlet and an outlet, and a controllable heater arranged for heating water for storage within said storage tank, comprising a solar heat collector having a surface which absorbs sunlight to produce heat, and a heat exchange passage for water in heat conductive relation with said absorbing surface, piping and pump means connected to said collector and said tank for circulating water from said tank outlet through said heat exchange passage to said tank inlet, an inflatable elastic member extending substantially the entire length of said collector passage, means to maintain air within said inflatable member at a higher hydrostatic air pressure than the static hydrostatic water pressure in said passage whereby said collector is rendered tolerant to freezing.

Another object of the invention is to provide a new and improved method of constructing a serpentine solar heat collector receiver comprising the sequential steps of first soldering separate absorbing fins and pipe fittings to a long straight pipe, then inserting a tubular elastic member into said pipe extending from one end to the other, and finally bending said pipe into a serpentine configuration.

In FIGS. 1 and 1A are shown a complete schematic embodiment of this invention as it would be installed in a house.

FIGS. 2 and 2A illustrate a method of constructing a serpentine solar heat receiver according to this invention.

FIG. 3 shows details of a partial cross-section of the collector of FIG. 2.

FIG. 4 illustrates an alternate method of attachment of the fins to the tube, while;

FIG. 5 is a cross-section of FIG. 4.

Figure 1A:
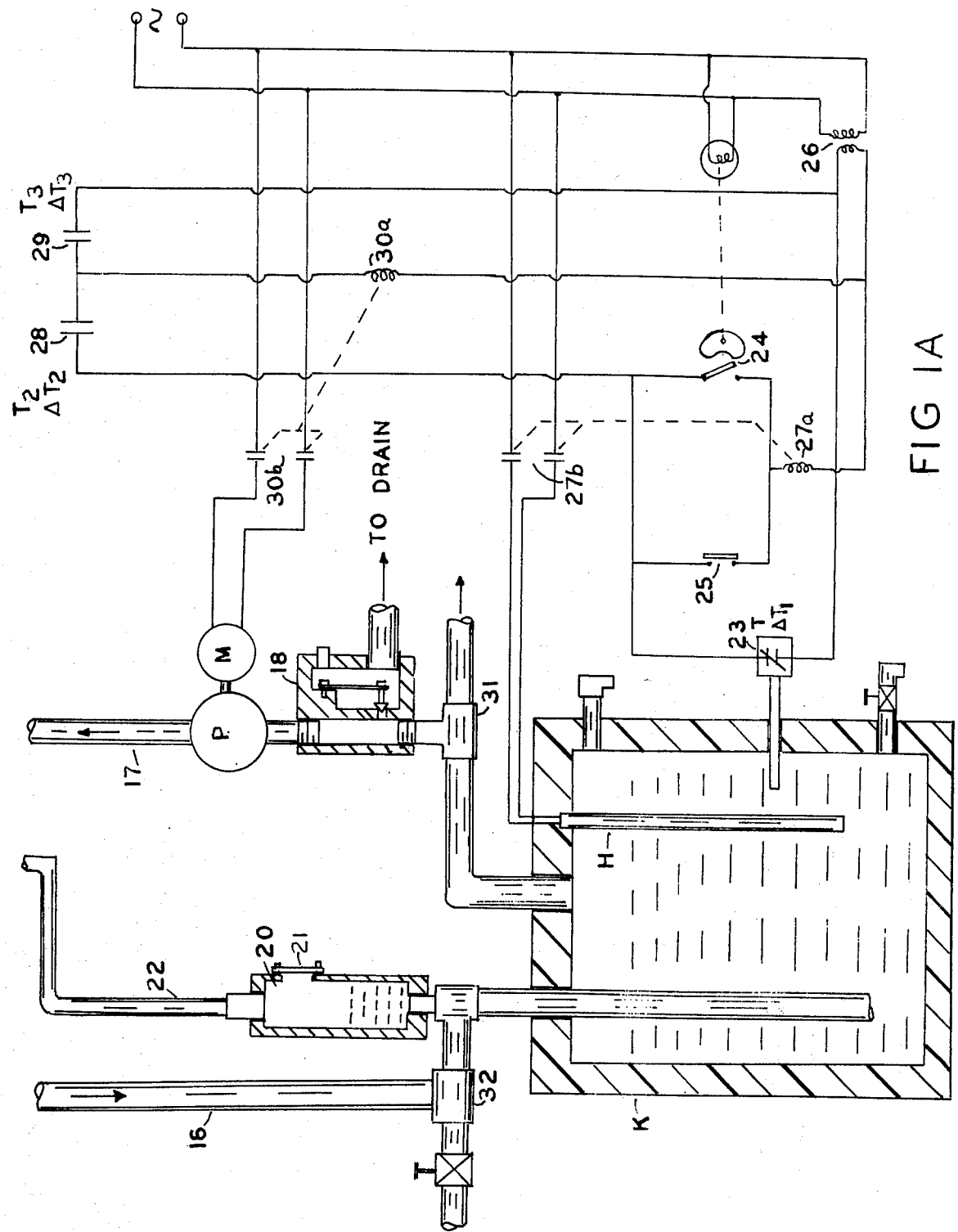

In usual domestic hot water heating systems, an insulated tank K, FIG. 1, receives cold water from a source of supply, which may be city water mains, heats the water by means of a fossil fuel burner or an electric heater H, to a temperature T, which is controlled by a thermostat 23, and delivers it to a domestic hot water piping system. The hot water tank K is generally located on a lower floor or in the basement. A pressure actuated safety valve is preferably provided to protect the tank from damage.

The auxiliary solar heating system is joined to the usual water heating system at Tee fittings 31 and 32, and a substitute electrical control circuit is inserted between the thermostat and the heating unit of the tank.

A solar heat collector panel 1, is mounted on a sloped generally south-facing roof 2, of the house. The collector consists of a serpentine tube 3 bonded to a series of sunlight-absorbing metal fins 4, 5, and 6. The collector is insulated in front by two transparent covers 7 and 8, spaced apart from the fins and secured to them by small, slender tripods, cemented to the surfaces. The bottom of the heat collector is nested in an insulating pad 9, which may be fiberglass. Below the insulating pad and secured to it by cement is a two-layer moisture-resistant plastic backing 10. A weather-resistant extended flexible member 11 seals the edge of the transparent covers, the receiver, and the insulating pad. An edge of the flexible member tucks between the two layers of the plastic backing. A portion of the lowest plastic layer projects beyond the edge of the collector, forming a tab which is nailed to the roof to secure the collector in place. The roofing material and a flashing strip 12, are assembled with the collector in conventional layered relation substantially as shown to prevent rain water from entering under the collector. The ends 3a, 3b, of the serpentine tube are bent at right angles and pass through the roof through holes bored for the purpose. They are ended with adapter Tee fittings, 13, 14, which are each soldered to the tube on one arm and tapped for threaded pipes on the other two openings.

The receiver fins, 4, 5, etc., surface preferably may be coated with a selective coating such as copper oxide, which efficiently absorbs sunlight, but does not radiate much heat. The two transparent covers may be of fiberglass-reinforced polyester, which reflects glare diffusely, transmits sunlight well, withstands typical temperature extremes, cements adequately, and toughly conforms to normal rough handling in mounting, without breakage. The tripods may be molded of thermoset glass-reinforced plastic which cements well with silicone rubber cements, withstands the maximum temperatures attained, and conducts little heat through the slender legs. Other spacers, such as paper cones, wire forms, or blocks of foam glass can be used. The extruded edge strip may be of silicone rubber or another elastomer compounded to resist ultraviolet and ozone aging.

Inside the serpentine collector tube, extending from one end fitting to the other, is an air-filled rubber tube 15. This tube, which is shown in section in FIG. 3, has relatively thin walls so it may be easily collapsed by a small extra pressure on the outside. It may have longitudinal reinforcing cords or wires embedded in the wall of the tube which prevent it from stretching lengthwise. The two ends of this tube are secured on barbed adapters screwed into the Tee adapter fittings which terminate the collector tube as shown in FIG. 1.

Water-circulating connection pipes 16 and 17 are threadedly assembled in the fittings 13 and 14, bringing water up from the hot water side of the tank at fitting 31 and returning it to the cold water side at fitting 32. A pump P preferably near the bottom of the pipe 17 as shown, causes water to circulate through the collector when the collector is hot enough. A temperature-responsive relief valve 18 is mounted on the pipe 17, and set to discharge water to a drain if unsafe water temperatures are reached. Also mounted on a tee-branch from the return line is a small trapping air reservoir 20 with a sight glass 21, to check that there is air in it, and a vent plug screw to assist in draining excess water. The air in the reservoir communicates with the inside of the rubber tube in the collector via a small rigid tube 22 threadedly coupled to the fitting 13. The other end of the rubber tube, at fitting 14 is plugged.

The electrical control for the electric tank heater shown consists of a low voltage contact thermostat 23, a fixed time interval manual override switch 25, a transformer 26 to provide low voltage, and a relay 27a, 27b, to interrupt the heater current, connected as shown.

The electrical control for the pump motor M includes the tank thermostat 23, the contact 28, which closes at temperature $T_2$ of the collector in series with it, the contact 29, operating at a higher collector temperature $T_3$, and the relay 30a, 30b, which interrupts the motor current, connected as shown:

Other more elaborate control systems could be employed which might result in more efficient use of the heat-collecting capabilities of the collector.

The operation of this system is as follows:

When the tank is cold and collector is cold and no hot water demand is expected soon, neither the electric heater nor the pump is working, and the water remains cold. The rubber tube inside the collector being pressurized by air at the hydrostatic pressure near the bottom of the system and surrounded by water at the hydrostatic pressure at the top of the system, is inflated to occupy a substantial part of the metal collector tube. When the outdoor temperature is below freezing, some or all of the water in the collector tube may freeze and expand, but since the rubber tube provides an easily-deformable surface, the metal tube will not be subjected to damaging stress.

When the temperature of the solar heat collector reaches $T_2$ while the tank is below the temperature $T_1$, low voltage current will flow through contact 28 to the coil 30a and actuate relay contact 30b, and power will flow to the circulating pump motor M. Water will be circulated through the collector, picking up heat and delivering it to the tank K. $T_1$, $T_2$, $T_3$ and $T_4$ are predetermined temperatures. The pressure produced by the pump is sufficient to overcome the hydrostatic head pressure and collapse the rubber tube, which therefore cannot prevent flow from taking place. Any gross amount of water which may have diffused or seeped into the rubber tubing will be squeezed out toward the air reservoir line, so that the tube will always be in an empty condition to prevent freezing damage.

Circulation and heat transfer will continue until the collector temperature drops by some differential amount $\Delta T_2$ and contact 28 opens, or the tank temperature rises to $T_1$, and contact 23 opens. The circulation rate should be great enough to carry away all the heat that will be absorbed from sunlight without exceeding the maximum safe hot water temperature when the tank temperature is just under the thermostat setting $T_1$. The differential temperature $\Delta T_2$ should be great enough so that water will circulate until the collector temperature is below $T_1 - \Delta T_1$. With this combination of adjustments, the collector will work at good efficiency, and the on-off switching of the pump motor will be least frequent.

When the collector temperature reaches $T_1$ and the circulating pump shuts off, the collector temperature may continue to rise. At a very high temperature, portions of the collector could be degraded or damaged, and the water could be heated to unsafe pressures. To prevent such damage, the controller has a second temperature-responsive contact 29 which turns on the circulating pump when the temperature of the collector reaches $T_3$, even though the tank temperature is above $T_1$. Circulating water then continues to cool the collector and warm the tank. The differential temperature $T_3$ is set to turn off the pump just above the maximum safe tank temperature $T_4$, so that the motor will not be turning on and off frequently. When temperature $T_4$ is exceeded, the bimetal-operated relief valve 18 opens and drains hot water, and this hot water is replaced by colder water until the temperature drops below $T_4$.

Depending on the expected schedule of hot water usage, the settable timer 24 can be preset to bring the tank temperature up daily to the tank thermostat setting a little before it is needed. For use at other times the manual over-ride switch 25 may run the heater long enough to heat a tank of water and preferably, automatically shut off.

After the collector tubing 3 has been formed into a serpentine form as shown in FIG. 2, it is difficult to insert the rubber tube 15 into it. Accordingly, the rubber tube is drawn into the collector tube when it is straight, as shown in FIG. 2A, before bending. The rubber need not be able to withstand soldering temperatures because all soldering can be done before inserting the rubber.

Besides assisting in prefabricating the collector, division of the absorbing surface into separate fins eliminates shunting heat flow paths which lower the output temperatures which can be reached at a given level of sunlight. Alternatively, the serpentine configuration could be assembled from separate straight tube sections and compression elbows.

An alternative method of securing the fins 4, to the tube 3 in heat-conducting relation is illustrated in FIGS. 4 and 5. The tube 3, is first bent in an unsymmetric wave shape transverse to the plane of the collector, forming long, shallow, substantially circular convex arches joined by relatively short return bends as shown in FIG. 4. The absorber strip 4, substantially straight, is then secured to the tube at its ends 40 and 41. The strip is finally stretched tight against the tube by drawing it down and securing it at the return bend positions 44, 45 and 46. The strip may be mechanically secured at these positions by buckles 42 and staple clips 43, FIG. 5. Permanent thermal contact between the strip 4 and the tube 3, is assured by the elastic tension trapped in the strip and the tubing. The contact area may be slightly extended by prebending a longitudinal semi-circular dent 47 in the strip.

A necked-down section 33 in the collector tube 3 fits closely around the expanded rubber tube 15. This prevents circulation of water through the collector when the pump is not running, and thus prevents heat loss from the tank when the sun is not shining. When the pump is running, its pressure easily collapses the rubber tube, allowing water to flow freely through the neck.

Other configurations of collector tubing can be protected from freezing damage in a similar way by an inflated rubber member. For example, an absorber might be made of formed laminations of metal having several parallel passages for circulating water, secured in layered relation with a flexible rubber membrane, with means for circulating heat transfer water between the membrane and one metal lamination, and means for supplying air under greater hydrostatic pressure between the membrane and the other metal lamination. Other usable configurations will occur to those skilled in the art.

As is well known somewhat more efficient use of the heat collected can be achieved if the control circuit continuously monitors and compares the temperatures of the collector and the tank, operating the circulating pump whenever the collector temperature exceeds the tank temperature, up to the maximum safe tank temperature. Other more elaborate control systems making use of variable flow rates can be employed to gain a small additional efficiency of collector use. If the rubber and plastic elements of the collector tolerate the extreme high temperatures, which may reach 350° F, it would be unnecessary to cause the water to circulate at high temperatures to carry away heat, and it would be unnecessary to provide a thermal relief valve. Alternatively, a thermal relief valve would be unnecessary if hot water well above boiling temperature could be tolerated safely. The control described herein is preferred because of its simplicity, because less expensive rubber and plastic elements can be used in the collector, and because domestic hot water above 165° F. is not considered safe.

I claim:

1. A system for solar heating of water in combination with a domestic hot water system having a hot water storage tank having an inlet and an outlet, and a controllable heater arranged for heating water for storage within said storage tank, comprising,
   a solar heat collector having a surface which absorbs sunlight to produce heat, and a heat exchange passage for water in heat conductive relation with said absorbing surface,
   piping and pump means connected to said collector and said tank for circulating water from said tank outlet through said heat exchange passage to said tank inlet,
   an inflatable elastic member extending substantially the entire length of said collector passage, means to maintain air within said inflatable member at a higher hydrostatic air pressure than the static hydrostatic water pressure in said passage whereby said collector is rendered tolerant to freezing.

2. Apparatus as in claim 1 having first control means responsive to time and to tank temperature for operating said controllable heater.

3. Apparatus as in claim 2 having second control means responsive to tank temperature and collector temperature for operating said pump means and keeping the tank and collector temperatures within safe limits.

4. A system according to claim 3, in which said solar heat collector heat exchange water passage is a continuous pipe formed into a serpentine configuration, and said inflatable member is a continuous tube of elastic material extending the entire length of said pipe.

5. A system according to claim 4, in which said means for maintaining said air pressure is a reservoir containing trapped air connected in open flow relation to one end of said continuous elastic tube, the other end of said continuous elastic tube being closed, and said reservoir is connected to said water-circulating piping at a lower height than said collector.

6. A system according to claim 3, in which said first control means includes a thermostat responsive to tank temperature for actuating said controllable water pump and a timer for inhibiting said actuation except during preset time intervals.

7. A system according to claim 6, in which said first control means includes a manual device which can over-ride said inhibiting effect of said timer.

8. A system according to claim 6, in which said second control means includes first means responsive to collector temperature in combination with said tank temperature thermostat for actuating said water circulating pump means.

9. A system according to claim 8, in which said second control means includes second means responsive to said collector temperature for actuating said water circulating pump means and means actuated by tank water temperature for discharging water above a predetermined safe water temperature.

* * * * *